No. 791,311. PATENTED MAY 30, 1905.
E. H. BAUGH.
ANIMAL TRAP.
APPLICATION FILED OCT. 25, 1904.

Witnesses

Inventor
E. H. Baugh
By
Attorneys

No. 791,311. Patented May 30, 1905.

UNITED STATES PATENT OFFICE.

EDWARD H. BAUGH, OF KINCAID, KANSAS.

ANIMAL-TRAP.

SPECIFICATION forming part of Letters Patent No. 791,311, dated May 30, 1905.

Application filed October 25, 1904. Serial No. 229,945.

*To all whom it may concern:*

Be it known that I, EDWARD H. BAUGH, a citizen of the United States, residing at Kincaid, in the county of Anderson and State of Kansas, have invented certain new and useful Improvements in Animal-Traps, of which the following is a specification.

This invention relates to improvements in animal-traps of the type particularly adapted for catching rodents or the like.

The object of the invention is to secure a device of the above class which is of simple construction and operation and which is very effective for the purposes thereof.

The invention embodies, essentially, a suitable frame upon which are mounted coöperating jaws adapted to impale or strangle the animal and a peculiarly-mounted actuating member for the jaws, together with adjacent parts usually utilized in trap structures.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still some of the preferred embodiments are shown in the accompanying drawings, in which—

Figure 1:
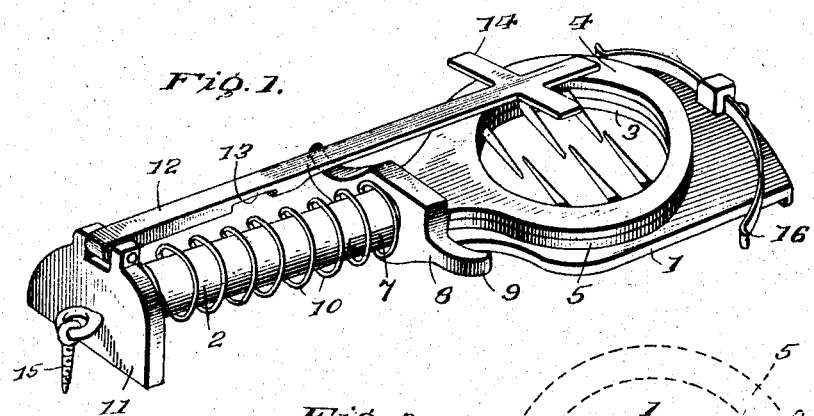
Figure 2:
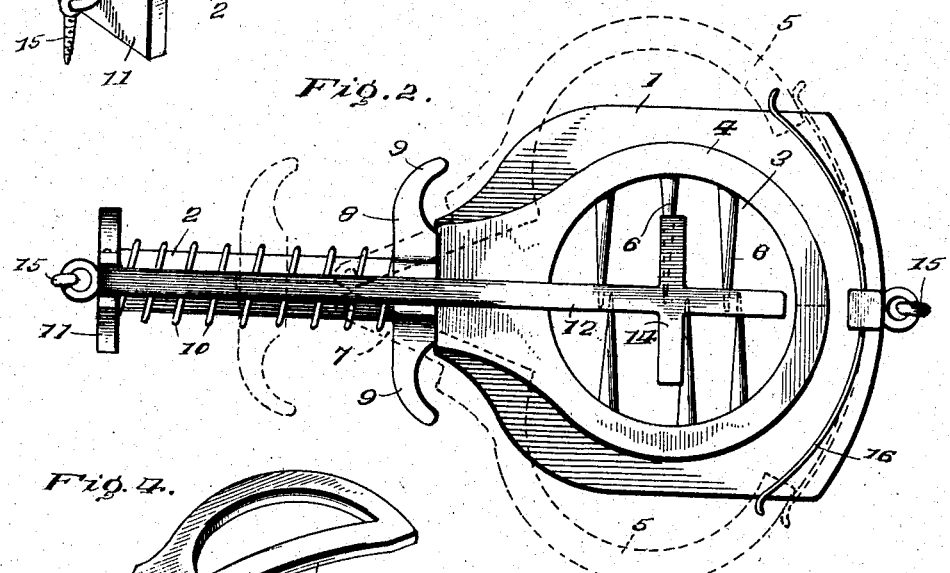
Figure 4:
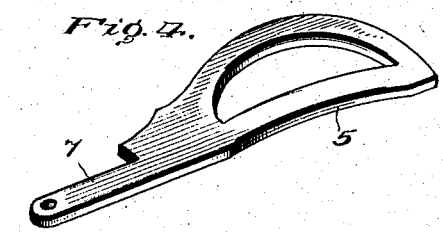
Figure 3:
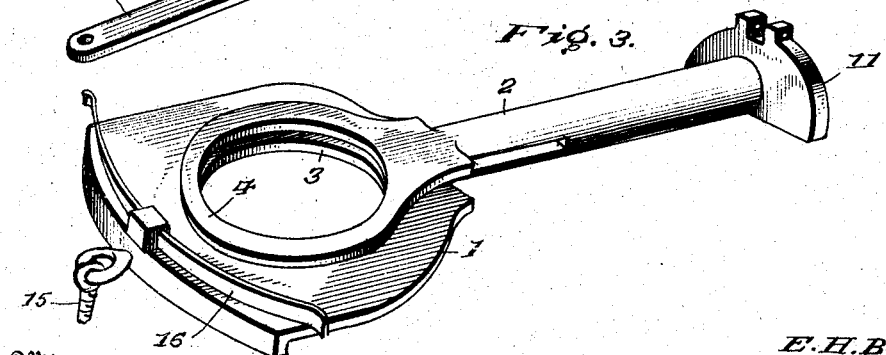

Figure 1 is a perspective view of an animal-trap embodying the essential features of the invention. Fig. 2 is a plan view, the trap being shown as when set off in full lines and set preparatory to use in dotted lines. Fig. 3 is a detail perspective view of the frame of the trap alone. Fig. 4 is a perspective view of a modified form of jaw adapted to be used in connection with the trap.

Corresponding and like parts are referred to in the following description and indicated in all the views of the drawings by the same reference characters.

The trap structure is composed of a frame consisting of a base 1, from which is projected an extension 2. The base 1 may be of any suitable form and is provided with an opening 3 therein. Upon the upper or outer side of the base and spaced therefrom is a circular plate or similar part 4, having an opening of substantially the same size as the opening 3 of the base, and said part 4 is likewise provided with an extension suitably secured to the extension 2 of said base 1. If the trap be made of metal, the parts 4, 2, and 1 may be made integral, if preferable, this not being essential in the contemplation of the invention. Jaws 5 are provided for the trap, and these jaws operate between the plate 4 and the jaws 1, being adapted to be separated by lateral movement in setting the trap and to be compressed or forced together when the trap is sprung by the animal. The jaws 5 are curved and are provided upon their inner portions with laterally-extended teeth 6, upon which the rodent may be impaled when the trap is set off. Each of the jaws 5 is provided with a shank 7, which shank is pivoted between spaced portions of the extensions of the base 1 and plate 4. The jaws 5 are actuated by a member slidably mounted upon the extensions of the base and part 4, this member preferably comprising a sleeve 8, receiving the extensions aforesaid and adapted for longitudinal movement thereon. The sleeve 8 is provided with lateral extensions 9, forming finger-pieces by which said sleeve may be readily grasped and forced rearwardly against the tension of a coil-spring 10, said spring being mounted upon the extensions of the base and plate. The spring 10 is interposed between the member 8 and an end piece 11, secured to the extremity of the extension 2 aforesaid.

Pivoted to the end piece 11 of the trap is a detent or trigger-bar 12, and this member is provided with a notch 13, adapted to receive the bar portion of the sleeve 8 to hold said sleeve in an adjustment in which same is under the tension of the spring 10. The bar 12 extends over the opening 3 and above the part 4 of the trap, so as to be in a position wherein it may be readily tripped by the animal who attempts to pass through the opening. In order to avoid likelihood of escape of the animal through the opening 3 without operating the bar 12, the end portion of this bar adjacent the opening is provided with lateral extensions 14.

It is designed that the trap when set be placed over the hole through which the animal will escape in order to pass out of its abode, and the trap is adapted to be secured in such position by means of fastening devices at opposite ends of the frame thereof. The fastening devices consist, preferably, of pivoted members 15, one mounted upon the base portion 1 and the other carried by the end piece 11, and these members are pointed, so as to be readily driven into the adjacent parts in order to prevent the trap from being carried off. The trap may be disposed either in a horizontal or upright position, as found necessary for its use, being illustrated in the former adaptation, however. To positively hold the jaws 5 open or separated, a flat spring 16 is used, said spring being mounted at the end portion of the base 1 opposite to that carrying the extension 2. The spring 16 is secured at a point between its ends, and its extremities are designed to frictionally engage the adjacent portions of the jaws 5 and prevent said jaws from being moved by vibration or jar of the trap.

In certain instances where it is desired to entrap fur-bearing animals the jaws utilized are of somewhat-different form in order that the animal may be strangled, and thus obviate likelihood of injury to its pelt which might arise from the impaling-teeth 6. Fig. 4 shows one of the modified forms of jaws which may be used in the capacity just mentioned, said jaws being composed of semicircular frames which will effectively accomplish the desired purpose, but which will not injure the animal in the same manner as will the teeth 6 of the jaws 5.

In using the trap the sliding member 8 is moved outwardly toward the end piece 11, so as to compress the spring 10, the finger-piece of the sleeve being grasped in positioning the sleeve 8, as mentioned. The detent-bar 12 is now engaged with the sleeve 8 to hold the same in its adjusted position, after which the jaws 5 are separated and engage with the spring 16, so as to be held in such position. The animal in attempting to pass through the opening 3 of the frame the base of the trap will trip the bar 12, so as to disengage same from the sleeve 8, and the latter, actuated by the spring 10, will be forced toward the base, and engaging the shanks 7 of each jaw said sleeve will effectively compress or force said jaws together, and thus impale the animal in a manner which will be readily comprehended. Having thus been forced together, the jaws 5 are virtually locked in a closed position, since the shanks thereof are received in the sleeve or sliding member 8, so that they cannot be separated by pivotal movement of the jaws until the part 8 has been moved outwardly.

Having thus described the invention, what is claimed as new is—

1. In an animal-trap, the combination of a base provided with an opening therein, a plate upon said base and spaced therefrom and provided with an opening substantially the size of the opening in the base, an extension projected from the base, jaws pivoted to the base and operating between the frame and the plate spaced therefrom, a sleeve mounted upon the extension of the base and coöperating with the jaws to actuate the same, a spring carried by the extension of the base and coöperating with the sleeve, a detent comprising a bar pivoted at one end to the extension aforesaid and having the other end adapted to be disposed above the opening in the base, said bar being provided with a notch between its ends to receive the sleeve aforesaid, and a spring attached to the base and adapted to engage the end portions of the jaws to hold said jaws separated.

2. In an animal-trap, the combination of a base, jaws pivotally mounted upon said base, a spring-actuated sleeve slidably mounted upon said base and coöperating with said jaws to actuate the same, a detent coöperating with the slidable member aforesaid and comprising a bar pivoted to the base and notched between its ends to receive the sleeve, and means for holding the jaws open or separated.

3. In an animal-trap, the combination of a base, jaws pivotally mounted upon said base, a spring-actuated member slidably mounted upon said base, and coöperating with said jaws to actuate the same, a detent coöperating with the slidable member aforesaid, and spring means for holding the jaws open or separated.

4. In an animal-trap, the combination of a base provided with an opening therein, jaws pivotally mounted upon said base, a shank projected from each of said jaws, a spring-actuated sleeve adapted to engage the shanks of the jaws, a detent-bar coöperating with said sleeve, and a spring engaging with the jaws to position the same.

In testimony whereof I affix my signature in presence of two witnesses.

EDWARD H. BAUGH. [L. S.]

Witnesses:
D. L. RAY,
J. W. ALDRIDGE.